United States Patent
Park et al.

(10) Patent No.: US 10,396,378 B2
(45) Date of Patent: Aug. 27, 2019

(54) DEVICE AND METHOD FOR IMPROVING STACK PERFORMANCE OF FUEL CELL SYSTEM

(71) Applicant: Hyundai Motor Company, Seoul (KR)

(72) Inventors: Hyo Jin Park, Gyeonggi-do (KR); Sang Soo Eun, Gyeonggi-do (KR); Ji Hyun Shim, Seoul (KR); Dae Jong Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 545 days.

(21) Appl. No.: 15/201,250

(22) Filed: Jul. 1, 2016

(65) Prior Publication Data
US 2017/0054167 A1    Feb. 23, 2017

(30) Foreign Application Priority Data
Aug. 21, 2015    (KR) ........................ 10-2015-0117778

(51) Int. Cl.
| | |
|---|---|
| *B60L 3/00* | (2019.01) |
| *B60L 58/33* | (2019.01) |
| *H01M 8/0432* | (2016.01) |
| *H01M 8/0438* | (2016.01) |
| *H01M 8/0444* | (2016.01) |

(Continued)

(52) U.S. Cl.
CPC ....... *H01M 8/04768* (2013.01); *B60L 3/0053* (2013.01); *B60L 58/33* (2019.02); *H01M 8/0432* (2013.01); *H01M 8/04358* (2013.01); *H01M 8/04417* (2013.01); *H01M 8/04455* (2013.01); *H01M 8/04559* (2013.01); *H01M 8/04753* (2013.01); *B60L 2240/62* (2013.01); *H01M 8/04723* (2013.01); *H01M 2250/20* (2013.01); *Y02T 10/7291* (2013.01); *Y02T 90/16* (2013.01); *Y02T 90/162* (2013.01); *Y02T 90/32* (2013.01); *Y02T 90/34* (2013.01)

(58) Field of Classification Search
CPC ........................ H01M 8/04768; H01M 8/0432
See application file for complete search history.

(56) References Cited

U.S. PATENT DOCUMENTS

| | | | |
|---|---|---|---|
| 9,905,864 B2 * | 2/2018 | Matsusue | H01M 8/04074 |
| 10,153,500 B2 * | 12/2018 | Paganelli | H01M 8/04097 |

(Continued)

FOREIGN PATENT DOCUMENTS

| | | |
|---|---|---|
| JP | 2002-093445 A | 3/2002 |
| JP | 2005-183281 A | 7/2005 |

(Continued)

*Primary Examiner* — Abdullah A Riyami
*Assistant Examiner* — Nader J Alhawamdeh
(74) *Attorney, Agent, or Firm* — Mintz Levin Cohn Ferris Glovsky and Popeo, P.C.; Peter F. Corless (57) ABSTRACT

A device and method for improving stack performance of a fuel cell system are provided. The device includes a fuel cell controller that operates a stack of a normal-pressure fuel cell system. When the fuel cell controller determines that an operating state of the stack is normal and a current intake air pressure is decreased as a result of monitoring the current intake air pressure, a current output, and an exterior air temperature of the stack, the fuel cell controller increases the amount of air to be supplied into the stack by adjusting a range of a theoretical air ratio which is a theoretical ratio of an air amount to a coolant temperature in the stack.

18 Claims, 4 Drawing Sheets

(51) Int. Cl.
     *H01M 8/04537*    (2016.01)
     *H01M 8/04701*    (2016.01)
     *H01M 8/04746*    (2016.01)

(56) References Cited

U.S. PATENT DOCUMENTS

| | | | |
|---|---|---|---|
| 2010/0320960 A1* | 12/2010 | Hasegawa | H01M 8/04037 320/101 |
| 2012/0308906 A1* | 12/2012 | Paganelli | H01M 8/04097 429/415 |
| 2014/0134508 A1 | 5/2014 | Ishikawa | |
| 2015/0311543 A1* | 10/2015 | Matsusue | H01M 8/04074 429/434 |
| 2015/0333348 A1* | 11/2015 | Byun | H01M 8/24 429/446 |
| 2016/0190616 A1* | 6/2016 | Kwon | H01M 8/04753 429/444 |
| 2017/0162886 A1* | 6/2017 | Kaneko | H01M 8/04776 |

FOREIGN PATENT DOCUMENTS

| | | | |
|---|---|---|---|
| JP | 2005-285610 A | | 10/2005 |
| JP | 2006-006088 A | | 1/2006 |
| JP | 2007-280827 A | | 10/2007 |
| JP | 2009-059660 A | | 3/2009 |
| KR | 20050070752 A | * | 7/2005 |
| KR | 10-0633876 B1 | | 10/2006 |
| KR | 10-1394677 B1 | | 5/2014 |

* cited by examiner

DEVICE AND METHOD FOR IMPROVING STACK PERFORMANCE OF FUEL CELL SYSTEM

CROSS-REFERENCE TO RELATED APPLICATION

This application claims under 35 U.S.C. § 119(a) the benefit of Korean Patent Application No. 10-2015-0117778 filed on Aug. 21, 2015, the entire contents of which are incorporated herein by reference.

BACKGROUND (a) Technical Field

The present disclosure relates to a device and method that improve stack performance of a fuel cell system, and more particularly, to a device and method that improve stack performance of a fuel cell system, which improves fuel efficiency by improving stack performance under a low-temperature and low-pressure operating condition.

(b) Background Art

Figure 1A:
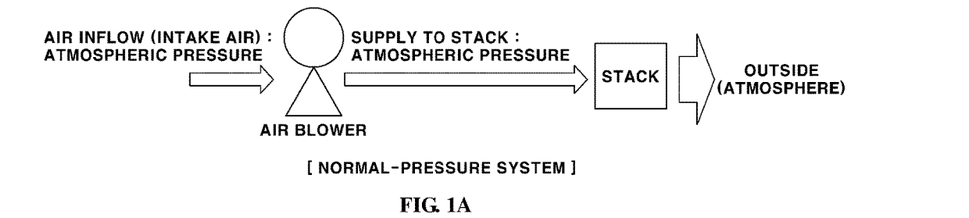
FIGS. 1A and 1B are schematic views illustrating states in which air pressure is changed during stack operations of a normal-pressure fuel cell system and a pressurized fuel cell system according to the related art.
Figure 1B:
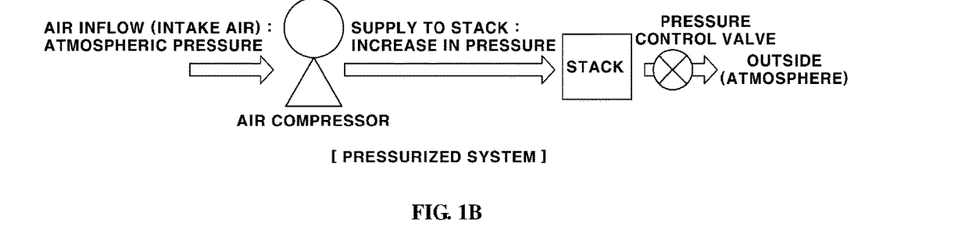

Stack performance of a fuel cell system under a normal-pressure operating condition is rapidly changed due to a change in an outside environment (e.g., outside temperature, atmospheric pressure, etc.). In particular, as atmospheric pressure decreases, the stack performance rapidly deteriorates in proportion to the decrease in atmospheric pressure. A pressurized fuel cell system, which uses a compressor, may overcome the deterioration in stack performance by adjusting stack working pressure, but a normal-pressure fuel cell system, which has no pressure control hardware, adjusts an air amount by adjusting a flow rate, and thus a deterioration in performance according to pressure is unavoidable, as shown in FIG. 1A-1B of the related art.

The normal-pressure fuel cell system has advantages in that efficiency thereof is high since noise, instability, and power consumption of auxiliary machinery are low. However, a part of the normal-pressure fuel cell system that is vulnerable to working pressure causes deterioration in vehicle performance. As a result, a decrease in atmospheric pressure caused by an increase in altitude, which is one of the various environmental conditions of a vehicle, degrades stack efficiency and adversely affects fuel efficiency.

A fuel cell stack for a vehicle is typically required to be operable under various environments without degrading performance. The stack performance/efficiency changes in proportion to a change in pressure among the environmental conditions. Therefore, the fuel cell system in which a stack reaction is controlled based on the amount (e.g., mass) of air is vulnerable to a deterioration in stack performance which is caused by an increase in altitude above sea level (i.e., a decrease in atmospheric pressure).

Meanwhile, deterioration in vehicle performance under a high altitude condition is a phenomenon that may be found in a vehicle with an internal combustion engine. In the case of the internal combustion engine, the deterioration in performance may be prevented by high altitude compensation. In addition, even in the fuel cell system capable of adjusting air pressure, pressure compensation in response to the high altitude may be adjusted by forcedly increasing stack working pressure. However, this system has a drawback in that efficiency thereof is low, and loud noise is generated.

The above information disclosed in this section is merely for enhancement of understanding of the background of the invention and therefore it may contain information that does not form the prior art that is already known in this country to a person of ordinary skill in the art.

SUMMARY

The present invention provides a device and method that improve stack performance of a fuel cell system, which is capable of preventing a deterioration in stack performance when working pressure is decreased, by variably adjusting a theoretical coolant air ratio among system operating conditions based on a coolant temperature and a water balance among stack operating conditions.

In one aspect, the present invention provides a device for improving stack performance of a fuel cell system that may include: a fuel cell controller configured to operate a stack of a normal-pressure fuel cell system, in which when the fuel cell controller determines that an operating state of the stack is normal and the current intake air pressure is being decreased as a result of monitoring the current intake air pressure, the current output, and the exterior air temperature of the stack, the fuel cell controller may be configured to increase the amount of air to be supplied into the stack by changing a range of a theoretical air ratio which is a theoretical ratio of an air amount to a coolant temperature in the stack.

In an exemplary embodiment, the fuel cell controller may be configured to reduce the range of the theoretical air ratio by fixing an upper limit value of the theoretical air ratio and increasing a lower limit value of the theoretical air ratio, and specifically, the fuel cell controller may be configured to increase the lower limit value of the theoretical air ratio by adding a theoretical air ratio compensation value to the lower limit value of the theoretical air ratio. In another exemplary embodiment, the theoretical air ratio compensation value may be a value that is increased in proportion to a decrease in intake air pressure of the stack, and a maximum compensation value may be set to restrict an increase in the amount of air to be supplied into the stack based on an increase in the lower limit value of the theoretical air ratio.

Further, the fuel cell controller may be configured to decrease a coolant target temperature to maintain a water balance in the stack when the range of the theoretical air ratio is changed, and specifically, the fuel cell controller may be configured to change a coolant target temperature value by adding a coolant target temperature compensation value to the current coolant target temperature. The coolant target temperature compensation value may be a negative (−) value that is increased in an absolute value in proportion to a decrease in the current exterior air temperature, and a maximum compensation value may be set to restrict a decrease in coolant target temperature of the stack according to the current exterior air temperature.

According to the device for improving stack performance of a fuel cell system according to the present invention, when stack working pressure of the normal-pressure fuel cell system is decreased as atmospheric pressure is decreased, the range of the theoretical coolant air ratio and the coolant target temperature may be corrected and adjusted, to increase oxygen partial pressure in the stack under a limit condition in which a water balance is maintained in the stack, and as a result, it may be possible to solve a problem of a deterioration in stack performance, and improve vehicle fuel efficiency by improving stack performance when a vehicle travels in an uphill section at a high altitude under a low-temperature and low-pressure condition.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, the present invention will be described so that those skilled in the technical field to which the present invention pertains may easily carry out the present invention.

Referring to FIGS. 1A-1B of the related art, as known, a pressurized fuel cell system, which may be controlled by forcedly increasing intake air pressure, may maintain oxygen partial pressure in a stack by constantly maintaining pressure (e.g., working pressure in a stack) by pressure control using an air compressor even though atmospheric pressure is decreased, but the pressurized fuel cell system has drawbacks in that energy consumption of auxiliary machinery increases, noise occurs, and a high-priced compressor is used. Further, a normal-pressure fuel cell system is unable to adjust intake air pressure, but has high system efficiency since energy consumption of auxiliary machinery is low, and advantages in terms of noise, costs, and drivability. However, in the normal-pressure fuel cell system, stack performance deteriorates as intake air pressure is decreased.

Accordingly, to prevent a deterioration in stack performance caused by a decrease in intake air pressure of the fuel cell system, and particularly, to prevent a deterioration in stack performance caused by a decrease in intake air pressure of the normal-pressure fuel cell system that adjusts working pressure by adjusting an air flow rate, the present invention additionally supplies air into the stack when atmospheric pressure (e.g., outside air pressure) decreases to prevent a deterioration in stack performance.

When the normal-pressure fuel cell system, which adjusts working pressure by adjusting an air flow rate, increases the flow rate of air supplied to the stack to compensate for atmospheric pressure (e.g., increase in oxygen partial pressure), a dry phenomenon occurs in which the stack becomes dry, and as a result, performance thereof rapidly deteriorates. Therefore, to prevent the dry phenomenon in which the stack becomes dry even though air is additionally supplied to the stack when atmospheric pressure is decreased, the present invention variably adjusts a coolant target temperature (e.g., a coolant operating temperature for activating the stack) to increase oxygen partial pressure in the stack under a limit condition in which a water balance is maintained in the stack.

Typically, a stack temperature may be represented as a coolant temperature in the stack, and relative humidity (RH, %), among the factors associated with stack performance, is directly related to the coolant temperature. In a case of forcedly increasing relative humidity by decreasing the coolant temperature, air may be additionally supplied to the stack, and as a result, it is may be to prevent a deterioration in stack performance and increase efficiency at high altitudes under a low-temperature and low-pressure condition compared to those at a low altitude.

In other words, when compensating for atmospheric pressure by additionally supplying air to the stack when the atmospheric pressure is decreased, the present invention variably adjusts a theoretical coolant-air ratio (e.g., a theoretical ratio between a coolant temperature and an air amount in the stack, hereinafter, referred to as 'theoretical air ratio') among system operating conditions based on a coolant temperature and a water balance among stack operating conditions, to improve stack performance when working pressure is decreased due to a decrease in atmospheric pressure. The theoretical air ratio (e.g., about 2.4) may be determined and set in advance to a value within a predetermined range (e.g., a lower limit value to an upper limit value, e.g., about 2.0 to 2.8) which may maintain a normal operating state and a normal water balance of the stack based on a coolant temperature and an air amount in the stack.

Figure 2:
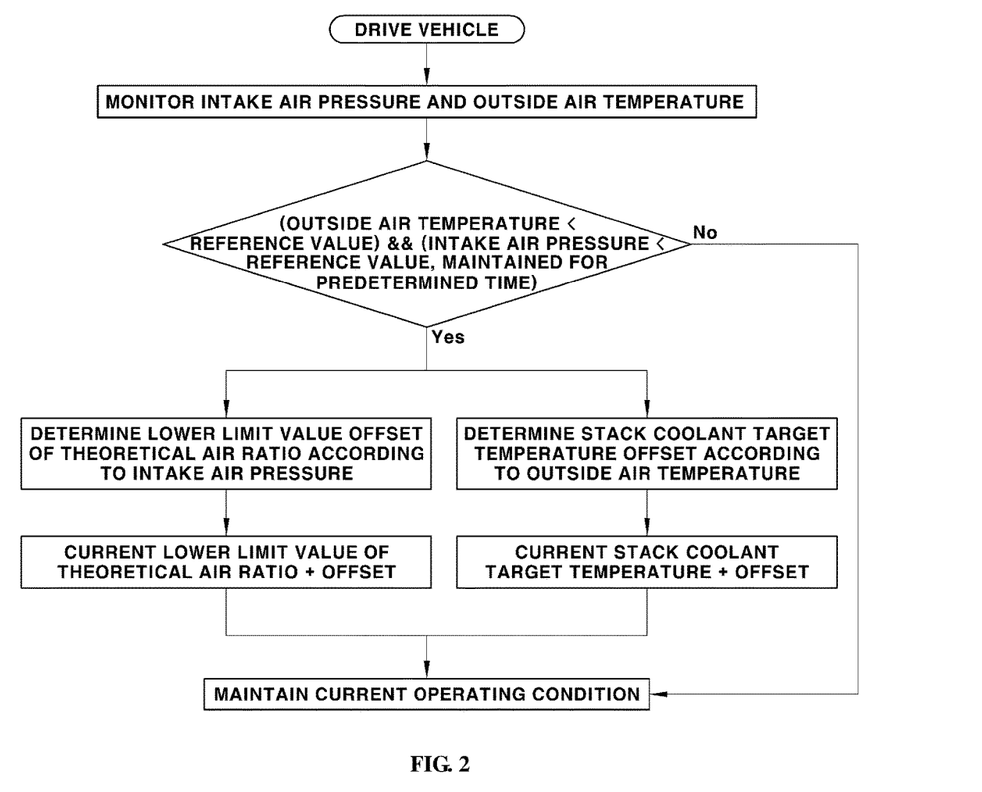
FIG. 2 is a schematic flowchart illustrating a method of improving stack performance of a fuel cell system according to an exemplary embodiment of the present invention.
Figure 3A:
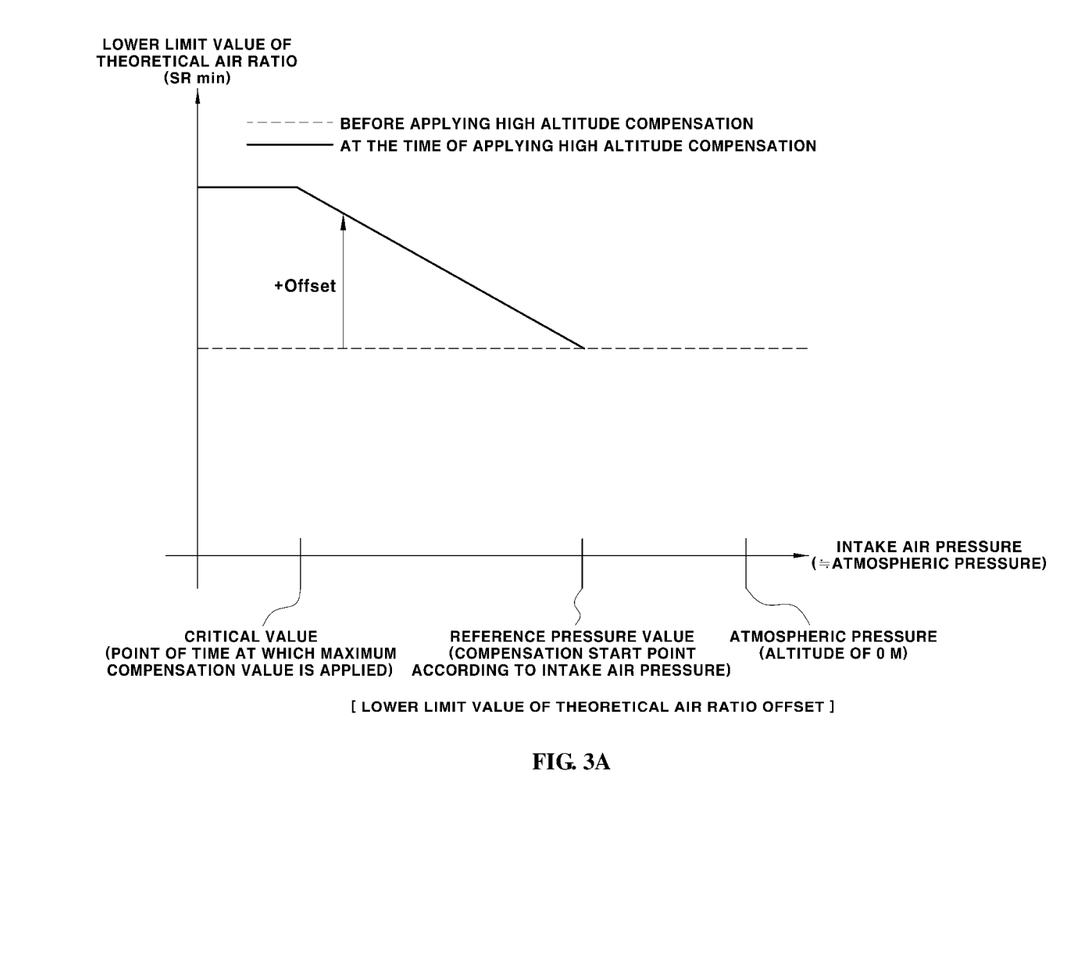
FIGS. 3A and 3B are schematic graphs illustrating a theoretical coolant-air ratio compensation value (offset) and a coolant target temperature compensation value for compensating for a low-temperature and low-pressure high-altitude condition in accordance with the method of improving stack performance according to an exemplary embodiment of the present invention.
Figure 3B:
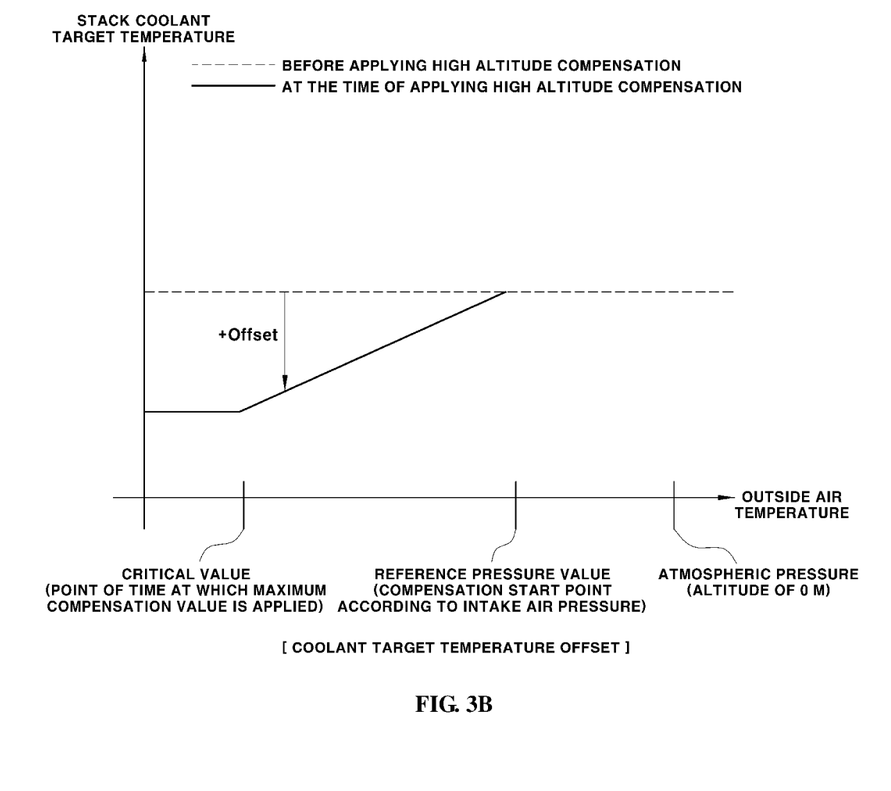

The attached FIG. 2 is a schematic flowchart illustrating a method of improving stack performance of the normal-pressure fuel cell system according to an exemplary embodiment the present invention, and FIGS. 3A and 3B are schematic graphs illustrating a theoretical air ratio compensation value (offset) and a coolant target temperature compensation value for compensating for a low-temperature and low-pressure high altitude condition.

Referring to FIG. 2, a fuel cell controller may be configured to operate the stack of the normal-pressure fuel cell system, and when the fuel cell controller recognizes that working pressure of a fuel cell stack is maintained lower than a normal pressure level (or than a critical value set for determining whether the stack is in a normal state) for a predetermined period of time (e.g., a predetermined period of time set for determining that the current state is not a temporary state) during an operation of the vehicle (i.e., a stack operation), the fuel cell controller may be configured to monitor the current stack output, the current exterior air temperature, the current intake air pressure which is air pressure being actually (currently) supplied to the stack, and detect a stack state.

Although not illustrated in the drawings, the current intake air pressure may be monitored by an intake air pressure measuring unit (e.g., sensor) of an air supply system in the fuel cell system of the vehicle, and the current exterior air temperature may be monitored by an exterior air temperature measuring unit (e.g., sensor) of the fuel cell vehicle. The pressure measuring unit and the exterior air temperature measuring unit may be configured to transmit detected signals to the fuel cell controller in real time.

The fuel cell controller may be configured to compare the monitored current stack output, the current intake air pressure value, and the current exterior air temperature value with a reference output value, a reference pressure value, and a reference temperature value, and as a result, when the current stack output is equal to or less than the predetermined reference output value, the current intake air pressure is equal to or less than the reference pressure value, and the current exterior air temperature is equal to or less than the predetermined reference temperature value, the fuel cell controller may be configured to determine that an operating state of the stack is normal. Further, when the current intake air pressure is not constantly maintained but gradually decreases, the fuel cell controller may be configured to detect a deterioration in performance due to a decrease in working pressure of the stack, and determine whether to change a lower limit value of the theoretical air ratio to improve stack performance, and determine whether to change a coolant target temperature to maintain a water balance in the stack.

Particularly, the reference pressure value, the reference output value, and the reference temperature value may be values determined and set through prior evaluation to determine whether the stack state (e.g., operating state of the stack) is normal. Under a low-temperature and low-pressure high altitude condition in which atmospheric pressure is gradually decreased, it may be possible to increase a lower limit value of the theoretical air ratio by decreasing a coolant operating temperature, and as a result, the amount of exterior air flowing into the stack may be increased, thereby increasing oxygen partial pressure in the stack.

Therefore, with the increase in lower limit value of the theoretical air ratio, it may be possible to decrease the coolant operating temperature, and as a result, it may be possible to increase the amount of air to be supplied into the stack. In particular, the upper limit value of the theoretical air ratio may be fixed to a predetermined value, and the lower limit value of the theoretical air ratio may be adjusted to variably adjust a range of the theoretical air ratio.

More specifically, when the monitored current stack output is equal to or less than the reference output value, the monitored current exterior air temperature is less than the reference temperature value, and the monitored current intake air pressure is less than the reference pressure value during an operation of the stack, the fuel cell controller may be configured to determine that an operating state and the water balance of the stack are normal (e.g., the stack operating condition is normal or operating without error). When the current intake air pressure (e.g., atmospheric pressure) is gradually decreased when the operating state of the stack is normal, the current lower limit value of the theoretical air ratio may be adjusted by adding a compensation value (e.g., theoretical air ratio compensation value) to the lower limit value of the theoretical air ratio in the values from the lower limit value to the upper limit value.

Referring to FIG. 3, the theoretical air ratio compensation value ay be set to a value increased in proportion to the decrease in intake air pressure, and a maximum compensation value (e.g., a maximum value of the theoretical air ratio compensation value) may be set in advance, to prevent air from being excessively supplied even though the current intake air pressure is decreased to a predetermined pressure (e.g., critical value) or less. In other words, since the maximum compensation value of the theoretical air ratio compensation value may be set, air may be prevented from being excessively supplied by restricting an increase in the amount of air to be supplied into the stack based on an increase in lower limit value of the theoretical air ratio.

Therefore, when the current intake air pressure value is less than the reference pressure value which is less than atmospheric pressure at an altitude of 0 m, the lower limit value of the theoretical air ratio may be increased in proportion to a decrease in the current intake air pressure, and when the current intake air pressure is equal to or less than the critical value, a maximum value (e.g., a maximum value of the lower limit value of the theoretical air ratio) may be maintained as a value to which the maximum compensation value is added. The fuel cell controller may be configured to adjust the current coolant target temperature by adding a compensation value (e.g., coolant target temperature compensation value) to the current coolant target temperature value to maintain the water balance in the stack.

Referring to FIG. 3, the coolant target temperature compensation value may be set to a value that is increased in an absolute value in proportion to a decrease in exterior air temperature, and a maximum compensation value (e.g., a maximum compensation value of the coolant target temperature) may be set in advance, and as a result, the coolant operating temperature may be prevented from being excessively decreased even though the current coolant target temperature is decreased to a predetermined temperature (e.g., critical value) or lower.

In other words, since the maximum compensation value of the coolant target temperature compensation value may be set, a decrease in coolant operating temperature based on a decrease in the current exterior air temperature may be restricted to prevent the coolant temperature from being excessively decreased. In particular, the coolant target temperature compensation value may be a negative (−) value, and by adding the coolant target temperature compensation value to the current coolant target temperature, the current coolant target temperature is decreased. When the current coolant target temperature value is less than the reference temperature value which is less than exterior air temperature at an altitude of 0 m, the coolant target temperature may be decreased in proportion to a decrease in the current exterior air temperature, and when the current outside air temperature is equal to or less than the critical value, a minimum value (e.g., a minimum value of the coolant target temperature) may be maintained as a value to which the maximum compensation value is added.

Furthermore, when the intake air pressure of the stack is gradually decreased in a state in which the stack state and the water balance are normal, the fuel cell controller may be configured to determine the theoretical air ratio compensation value based on the current intake air pressure, determine the coolant target temperature compensation value based on the current exterior air temperature to maintain the water balance in the stack, and then correct the current lower limit value of the theoretical air ratio and the current coolant target temperature by adding the determined compensation value to the current lower limit value of the theoretical air ratio and the current coolant target temperature, thereby solving a problem of a deterioration in stack performance in a state in which the current stack operating condition is maintained.

According to the present invention, it may be possible to solve the problem in that the normal-pressure fuel cell system fails to start due to excessive hydrogen line pressure which is caused by an operation defect of a high pressure regulator (HPR) when the vehicle is left unattended with a substantially low exterior air temperature (e.g., during winter season). When initially starting the fuel cell system, the normal-pressure fuel cell system may not be started when the hydrogen line pressure is equal to or greater than a reference value, thus causing a likelihood that the normal-pressure fuel cell system will fail to start. However, when the present invention is applied, the problem with excessive line pressure may be solved by a hydrogen purge using a purge valve, and as a result, a normal start may be enabled. When the vehicle is left unattended with a substantially low exterior air temperature, a leak may occur due to contraction of an O-ring in the HPR, allowing the normal-pressure fuel cell system to smoothly and successfully start while starting the vehicle even though the hydrogen line pressure is out of a normal range. Thereafter, after the hydrogen line pressure is at a normal level, a system temperature may be increased and the hydrogen line pressure may maintain a normal range even when the fuel cell system repeatedly starts. However, the same problem occurs when the vehicle is left unattended with a substantially low exterior air temperature, and thus it is necessary to apply the present technology.

Furthermore, according to the present invention, it may be easier to adjust the coolant at a low-temperature high altitude environment. It may be possible to prevent flooding under a low-temperature condition due to the characteristic of a high altitude, and it may be possible to improve both fuel efficiency and performance in an uphill section in which a load of the vehicle is increased (that requires high output) in a case in which the vehicle moves in an uphill and downhill section at a high altitude.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A device for improving stack performance of a fuel cell system, comprising:
   a fuel cell controller configured to operate a stack of a normal-pressure fuel cell system,
   wherein when the fuel cell controller determines that an operating state of the stack is normal and a current intake air pressure is decreased as a result of monitoring the current intake air pressure, a current output, and an exterior air temperature of the stack, the fuel cell controller is configured to increase the amount of air to be supplied into the stack by adjusting a range of a theoretical air ratio which is a theoretical ratio of an air amount to a coolant temperature in the stack,
   wherein the fuel cell controller is configured to control a coolant target temperature to maintain a water balance in the stack when the range of the theoretical air ratio is changed.

2. The device of claim 1, wherein the fuel cell controller is configured to reduce the range of the theoretical air ratio by fixing an upper limit value of the theoretical air ratio and increasing a lower limit value of the theoretical air ratio.

3. The device of claim 2, wherein the fuel cell controller is configured to increase the lower limit value of the theoretical air ratio by adding a theoretical air ratio compensation value to the lower limit value of the theoretical air ratio.

4. The device of claim 3, wherein the theoretical air ratio compensation value is a value that is increased in proportion to a decrease in intake air pressure of the stack.

5. The device of claim 3, wherein a maximum compensation value of the theoretical air ratio compensation value is set to restrict an increase in the amount of air to be supplied into the stack according to an increase in the lower limit value of the theoretical air ratio.

6. The device of claim 1, wherein the fuel cell controller is configured to decrease the coolant target temperature to maintain a water balance in the stack when the range of the theoretical air ratio is changed.

7. The device of claim 1, wherein the fuel cell controller is configured to adjust the coolant target temperature value by adding a coolant target temperature compensation value to the current coolant target temperature to maintain a water balance in the stack when the range of the theoretical air ratio is changed.

8. The device of claim 7, wherein the coolant target temperature compensation value is a negative value that is increased in an absolute value in proportion to a decrease in the current outside air temperature.

9. The device of claim 7, wherein a maximum compensation value of the coolant target temperature compensation value is set to restrict a decrease in coolant target temperature of the stack based on the current exterior air temperature.

10. A method for improving stack performance of a fuel cell system, comprising:
    operating, by a controller, a stack of a normal-pressure fuel cell system,
    in response to determining that an operating state of the stack is normal and a current intake air pressure is decreased as a result of monitoring the current intake air pressure, a current output, and an exterior air temperature of the stack, increasing, by the controller, the amount of air to be supplied into the stack by adjusting a range of a theoretical air ratio which is a theoretical ratio of an air amount to a coolant temperature in the stack,
    wherein the controller is configured to control a coolant target temperature to maintain a water balance in the stack when the range of the theoretical air ratio is changed.

11. The method of claim 10, further comprising: reducing, by the controller, the range of the theoretical air ratio by fixing an upper limit value of the theoretical air ratio and increasing a lower limit value of the theoretical air ratio.

12. The method of claim 11, further comprising: increasing the lower limit value of the theoretical air ratio by adding a theoretical air ratio compensation value to the lower limit value of the theoretical air ratio.

13. The method of claim 12, wherein the theoretical air ratio compensation value is a value that is increased in proportion to a decrease in intake air pressure of the stack.

14. The method of claim 12, wherein a maximum compensation value of the theoretical air ratio compensation value is set to restrict an increase in the amount of air to be supplied into the stack according to an increase in the lower limit value of the theoretical air ratio.

15. The method of claim 10, further comprising: decreasing, by the controller, the coolant target temperature to maintain a water balance in the stack when the range of the theoretical air ratio is changed.

16. The method of claim 10, further comprising: adjusting, by the controller, the coolant target temperature value by adding a coolant target temperature compensation value to the current coolant target temperature to maintain a water balance in the stack when the range of the theoretical air ratio is changed.

17. The method of claim 16, wherein the coolant target temperature compensation value is a negative value that is increased in an absolute value in proportion to a decrease in the current outside air temperature.

18. The method of claim 16, wherein a maximum compensation value of the coolant target temperature compensation value is set to restrict a decrease in coolant target temperature of the stack based on the current exterior air temperature.

* * * * *

UNITED STATES PATENT AND TRADEMARK OFFICE
CERTIFICATE OF CORRECTION

| | | |
|---|---|---|
| PATENT NO. | : 10,396,378 B2 | Page 1 of 1 |
| APPLICATION NO. | : 15/201250 | |
| DATED | : August 27, 2019 | |
| INVENTOR(S) | : Hyo Jin Park et al. | |

It is certified that error appears in the above-identified patent and that said Letters Patent is hereby corrected as shown below:

On the Title Page

At item (73) Assignee:, please replace:
"Hyundai Motor Company, Seoul (KR)

With:
"Hyundai Motor Company, Seoul (KR)
Kia Motors Corporation, Seoul (KR)"

Signed and Sealed this
Twenty-sixth Day of May, 2020

Andrei Iancu
*Director of the United States Patent and Trademark Office*